United States Patent
Tiana et al.

(10) Patent No.: US 9,177,204 B1
(45) Date of Patent: Nov. 3, 2015

(54) SPECTRALLY ENHANCED VISION SYSTEM FOR LOW VISIBILITY OPERATIONS

(75) Inventors: Carlo L. Tiana, Portland, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 487 days.

(21) Appl. No.: 13/247,691

(22) Filed: Sep. 28, 2011

(51) Int. Cl.
*G06K 9/00* (2006.01)

(52) U.S. Cl.
CPC .................. *G06K 9/0063* (2013.01)

(58) Field of Classification Search
CPC ..... H04N 7/127; H04N 7/166; H04N 9/3114; H04N 21/431; H04N 21/4312; H04N 21/4318; H04N 1/482; H04N 1/486; H04N 1/56; H04N 1/60; H04N 1/6027; H04N 1/6083; H04N 1/6086; G06T 2207/10032; G06T 2207/10048; G06T 19/006; G06T 7/40; G06T 7/0079; G06T 7/0081; G06T 7/408; G06T 2207/10024; G06K 9/0063; G06K 9/00671; G06K 9/00624; G06K 2009/00644; G06K 9/00637; G02B 27/01; G02B 27/017
USPC ......................................................... 382/260
See application file for complete search history.

(56) References Cited

U.S. PATENT DOCUMENTS

| | | | |
|---|---|---|---|
| 4,515,442 A * | 5/1985 | Aron | 359/491.01 |
| 6,819,717 B1 * | 11/2004 | Sasai et al. | 375/240.29 |
| 7,089,092 B1 | 8/2006 | Wood et al. | |
| 7,570,832 B2 * | 8/2009 | Chui et al. | 382/260 |
| 7,617,022 B1 | 11/2009 | Wood et al. | |
| 8,149,268 B1 * | 4/2012 | Meyers et al. | 348/42 |
| 8,280,160 B2 * | 10/2012 | Matsuoka | 382/166 |
| 8,560,150 B1 * | 10/2013 | Phillips et al. | 701/16 |
| 8,761,506 B1 * | 6/2014 | Padwick et al. | 382/167 |
| 2002/0093521 A1 * | 7/2002 | Daly et al. | 345/698 |
| 2003/0132860 A1 * | 7/2003 | Feyereisen et al. | 340/973 |
| 2005/0161603 A1 * | 7/2005 | Kerr | 250/330 |
| 2006/0197006 A1 * | 9/2006 | Kochi | 250/208.1 |
| 2007/0058848 A1 * | 3/2007 | Heike et al. | 382/128 |
| 2007/0240056 A1 * | 10/2007 | Pepitone | 715/705 |
| 2008/0195315 A1 * | 8/2008 | Hu et al. | 701/212 |
| 2008/0204280 A1 * | 8/2008 | Reason et al. | 340/955 |
| 2008/0253653 A1 * | 10/2008 | Gable | 382/173 |
| 2008/0300735 A1 * | 12/2008 | He | 701/3 |
| 2009/0200466 A1 * | 8/2009 | Mammen et al. | 250/330 |
| 2010/0289885 A1 * | 11/2010 | Lu et al. | 348/61 |
| 2011/0037725 A1 * | 2/2011 | Pryor | 345/174 |
| 2011/0122308 A1 * | 5/2011 | Duparre | 348/340 |
| 2013/0121546 A1 * | 5/2013 | Guissin | 382/128 |

* cited by examiner

*Primary Examiner* — Michelle Entezari

(74) *Attorney, Agent, or Firm* — Angel N. Gerdzhikov; Donna P. Suchy; Daniel M. Barbieri

(57) ABSTRACT

A system for enhancing an image displayed on a display unit of an aircraft is shown and described. The system includes an enhanced vision system that detects a scene and enhances the scene for display on the display unit. The enhanced vision system includes a sensor having a filter configured to filter out all but at least one narrowband spectrum of light from the scene to detect elements of a first color. The enhanced vision system causes remaining content of the scene to be removed from the filter output for completing the detection of the elements of the first color. The enhanced vision system enhances the elements of the first color on the display unit.

15 Claims, 10 Drawing Sheets

SPECTRALLY ENHANCED VISION SYSTEM FOR LOW VISIBILITY OPERATIONS

BACKGROUND

The present invention relates generally to the field of aircraft navigation. The present invention more particularly relates to the fields of aircraft navigation systems and display features.

Some modern aircraft include enhanced vision systems that detect and enhance airfield approach lighting. Conventional enhanced vision systems (EVS) use an infrared sensor to detect the thermal signature of airfield approach lighting for operations in low visibility. Updates at some airports involve a transition to LED-based lighting. The thermal signatures of some LED-based lighting systems are not significant enough for reliable detection by conventional EVS systems or sensors.

What is needed are systems and methods for improving detection of airfields having low thermal signature levels.

SUMMARY

One embodiment of the invention relates to a system for enhancing an image displayed on a display unit of an aircraft. The system includes an enhanced vision system that detects a scene and enhances the scene for display on the display unit. The enhanced vision system includes a sensor having a filter configured to filter out all but at least one narrowband spectrum of light from the scene to detect elements of a first color. The enhanced vision system causes remaining content of the scene to be removed from the filter output for completing the detection of the elements of the first color. The enhanced vision system enhances the elements of the first color on the display unit.

Another embodiment of the invention relates to a method for enhancing an image displayed on a display unit of an aircraft. The method includes using an enhanced vision system to detect and enhance a scene for display on the display unit. The enhanced vision system includes a sensor having a filter. The method also includes using the filter to filter out all but at least one narrowband spectrum of light from the scene to detect elements of a first color. The method further includes causing the remaining content of the scene to be removed from the filter output for completing the detection of the elements of the first color. The method further includes enhancing the elements of the first color on the display unit.

Another embodiment of the invention relates to computer-readable media comprising computer executable instructions for completing the following steps: using an enhanced vision system to detect and enhance a scene for display on the display unit, the enhanced vision system comprising a sensor comprising a filter; using the filter to filter out all but at least one narrowband spectrum of light from the scene to detect elements of a first color; causing the remaining content of the scene to be removed from the filter output for completing the detection of the elements of the first color; and enhancing the elements of the first color on the display unit.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, systems and methods for enhancing an image displayed on a display unit of an aircraft are shown and described. The system includes an enhanced vision system (EVS) that detects elements of a scene (e.g., elements of an approach lighting system (ALS), hazards such as trees, buildings, hills or mountains, etc., and any other elements present in the scene) and enhances certain detected elements for display on the display unit. The EVS includes a sensor having a filter configured to filter out all but at least one narrowband spectrum of light from the scene for detection elements of at least a first color. The EVS causes the residual or remaining content of the scene to be removed from the filter output for completing the detection of the elements of the first color. The enhanced elements of the first color are displayed on the display unit (e.g., using display electronics).

Figure 1:
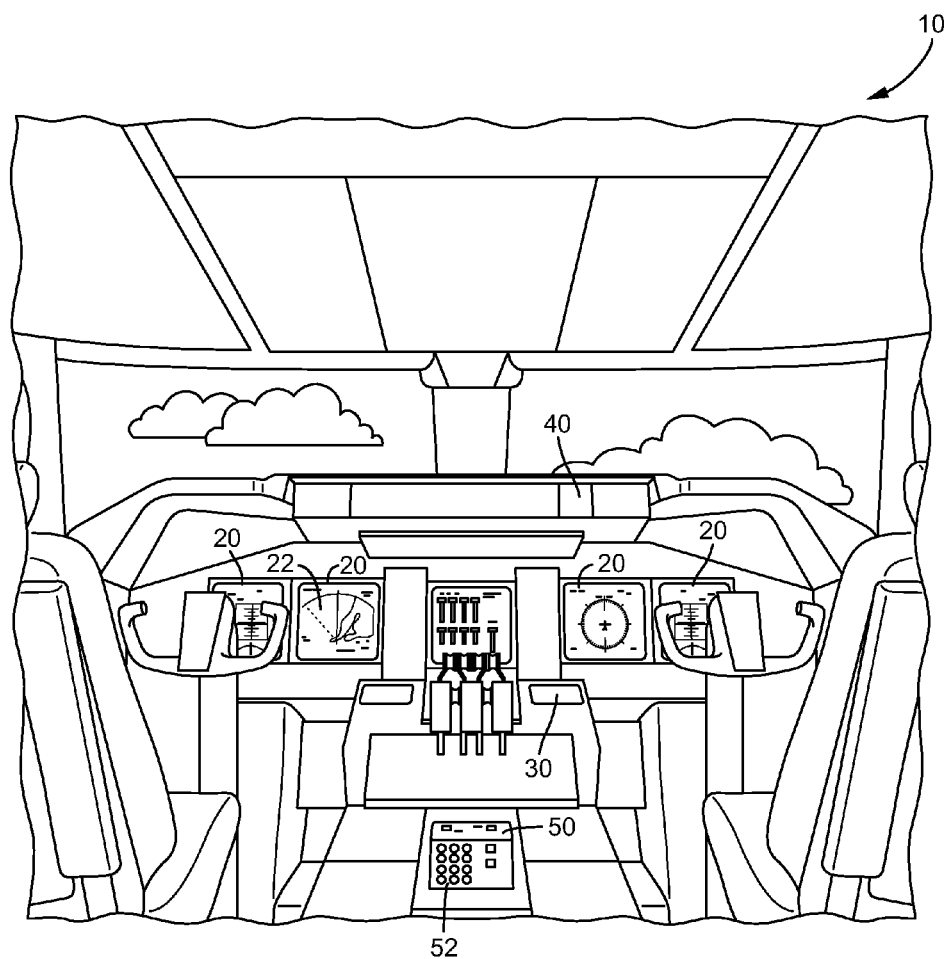
FIG. 1 is an illustration of an aircraft control center, according to an exemplary embodiment.

Referring to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from navigation, communications, and/or radar systems of the aircraft. In an exemplary embodiment, flight displays 20 may provide a top-down view, a horizontal view, or any other view of airport features, weather and/or terrain detected or estimated by the aircraft systems. The views may be monochrome or color graphical representations. Graphical representations may include an indication of altitude of those objects or the altitude relative to the aircraft. Flight displays 20 may include a touch sensitive surface 22 configured to receive touch gestures relative to the images shown on display 20.

Aircraft control center 10 may further include other user interface elements such as an audio input/output device 30 (e.g., speaker, electro-acoustic transducer, voice command recognition device, etc.), illuminating or flashing lamps 40, and a cursor control device 50. Cursor control device 50 may include knobs and buttons configured to move a cursor on display 20, to navigate through lists of information, and to make selections. The buttons of cursor control device 50 may include a keypad 52 configured to enable a user to type information for entry into the processing electronics system, for example, to enter latitudinal and longitudinal coordinates.

Figure 2:
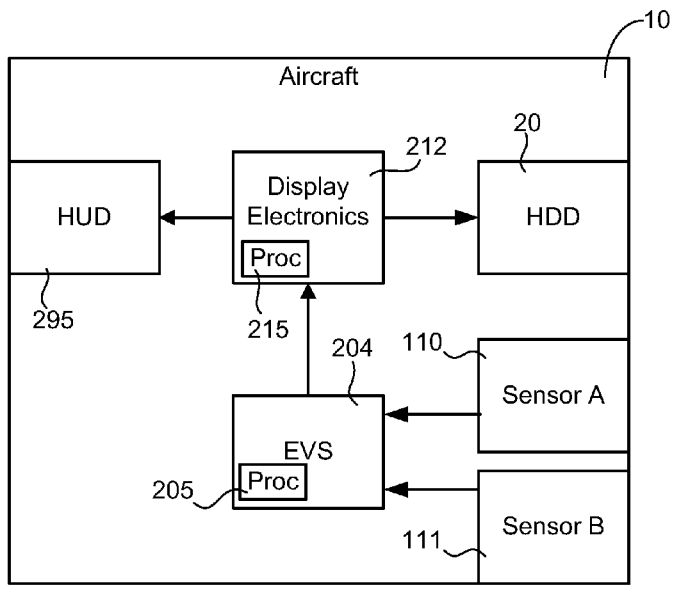
FIG. 2 is a block diagram of a system for controlling an image displayed on a display unit of an aircraft, according to an exemplary embodiment.

Referring now to FIG. 2, a block diagram of an aircraft is shown to include aircraft control center 10 (e.g., of FIG. 1). The aircraft includes an enhanced vision system 204. Enhanced vision system 204 uses forward-looking sensors 110, 111 to detect elements for display (e.g., lights of an approach lighting system, hazards such as trees, buildings, hills or mountains, etc.). The enhanced vision system 204 can enhance detected elements for display on a display unit 20 and/or head-up display 295. Display electronics 212 receive outputs from enhanced vision system 204. The display electronics are configured to cause enhanced elements from the enhanced vision system to be displayed on a display unit (e.g., one of display 20, display 295).

Embodiments of the systems and methods described herein utilize selected features of the enhanced vision system 204 to provide information to a displayed scene. Using exemplary embodiments described herein, a decluttered or basic vision system image of a runway or runway features (i.e., an iconic depiction of the location of approach lighting systems (ALS) light sources, a graphical depiction of an extended runway centerline, a graphical depiction of a runway outline, etc.) can be generated by the enhanced vision system. The decluttered or enhanced image can be displayed by itself (i.e., just the decluttered image), or can be displayed with a background image of the scene (e.g., from the same camera, another camera, a synthetic scene from a synthetic vision system, etc.). For example, some embodiments of the present disclosure may overlay enhanced elements of a scene with the actual scene as detected by a camera. Exemplary systems and methods of the present application advantageously improve an aircraft operational envelope in low visibility conditions even when LED lights are used in an approach lighting system.

Referring still to FIG. 2, the enhanced vision system ("EVS") 204 may provide a real-world image on display units 20, 295 of the scene in front of an aircraft. Using EVS 204, the aircraft can provide the pilot with an enhanced view of an approach scene even if visibility of the actual scene may be limited or obscured (e.g., by smoke, sand, fog, clouds, rain, snow, etc.). At least one sensor may be mounted on the aircraft for detecting visual light emanating from the environment in front of the aircraft. The sensor may be a camera configured to detect visible wavelengths, infrared wavelengths, near-infrared radiation, or a combination thereof. While two sensors 110, 111 are shown as providing information to EVS 204, in some embodiments only a single sensor or camera may provide images to EVS 204. In other embodiments, additional sensors may be provided beyond sensors 110, 111. According to one exemplary embodiment, sensor 110 is a visual light sensor and sensor 111 is a non-visual wavelength sensor (e.g., near infrared, infrared) used to detect background content of a scene. EVS 204 and processor 205 may be configured to prepare enhanced image data received from the sensors 110, 111 for subsequent processing, for example, by display electronics 212.

Processor 205 may be or include a microprocessor, microcontroller, application-specific integrated circuit (ASIC), or other circuitry configured to perform or support the processes described in the present application for the processor's respective parent circuits (e.g., EVS 204). EVS 204 may be or include computer systems (e.g., embedded computer systems, real-time operating systems, etc.) that use processor 205 to receive inputs, analyze the inputs, and to generate and output appropriate outputs. The I/O devices shown in FIG. 1 can be communicably connected to the components of FIG. 2. For clarity, not all such connection lines or I/O devices (e.g., a keypad) are shown in FIG. 2. Each of the aircraft's components of FIG. 2 may include input/output interfaces for receiving appropriate I/O wires or communication busses. The input/output interfaces (which may be represented in FIG. 2 by the intersection of the illustrated communication lines and the block boundaries) may include appropriate jacks, terminals, transceivers, ports, filters, or any other suitable hardware for sending or receiving a communication signal on a wire or communication line. While FIG. 2 illustrates connections as being wired, any of the connections may be wireless (e.g., optical, RF, etc.) or include wireless components.

EVS 204 may include memory devices (e.g., RAM, ROM, Flash memory, hard disk storage, etc.) for storing data and/or computer code for completing and/or facilitating the various processes described in the present disclosure. The memory devices may be or include volatile memory or non-volatile memory. The memory devices may include database components, object code components, script components, or any other type of information structure for supporting the various activities and information structures of the present disclosure. The memory devices may also or alternatively be configured to store buffered or generated images (e.g., bitmaps, compressed images, video data, etc.) for outputting to display electronics 212. In other embodiments, generated enhanced vision elements are created and output from EVS 204 with metadata for parsing by display electronics 212. For example, EVS 204 may send a mark-up language description of captured image objects for display to display electronics 212. Display electronics 212 may parse the mark-up language and position, enhance, outline, label, or otherwise process the captured image object for display based on the mark-up language. EVS 204 and processor 205 may each include memory having computer code for execution by a processing circuit (e.g., processor 205, another processor of EVS 204).

HUD 295 may be a head-up display of any suitable technology of the past, present, or future. In an exemplary embodiment, HUD 295 may be a projection/combiner type HUD. Electronics for driving the HUD 295 may be a part of HUD 295, a part of display electronics 212, or distributed among HUD 295 and display electronics 212.

Head down display (HDD) 20 may be a cathode ray tube (CRT), LCD, OLED, or a display unit of another display technology. Electronics for driving the HDD 20 may be a part of HDD 20, a part of display electronics 212, or distributed among HDD 20 and display electronics 212.

The processor 215 of display electronics 212 may include or access a memory device of display electronics 212. The processor 215 may execute computer code stored in the memory device to complete the activities described herein with respect to the display electronics. In an exemplary embodiment, display electronics 212 uses a coupled memory device to buffer the enhanced detected elements received from the enhanced vision system and to buffer non-enhanced elements of a scene (e.g., background scene from a camera). The display electronics 212 generally, and processor 215 more particularly, may then cause the elements to be shown on the same scene of one of the display units in the aircraft (e.g., one of displays 20, 295, etc.). In an alternative embodiment where enhanced vision system objects are overlaid on a synthetic vision system scene, display electronics 212 can buffer and synchronize the enhanced vision system objects and the synthetic display scene.

Figure 3:
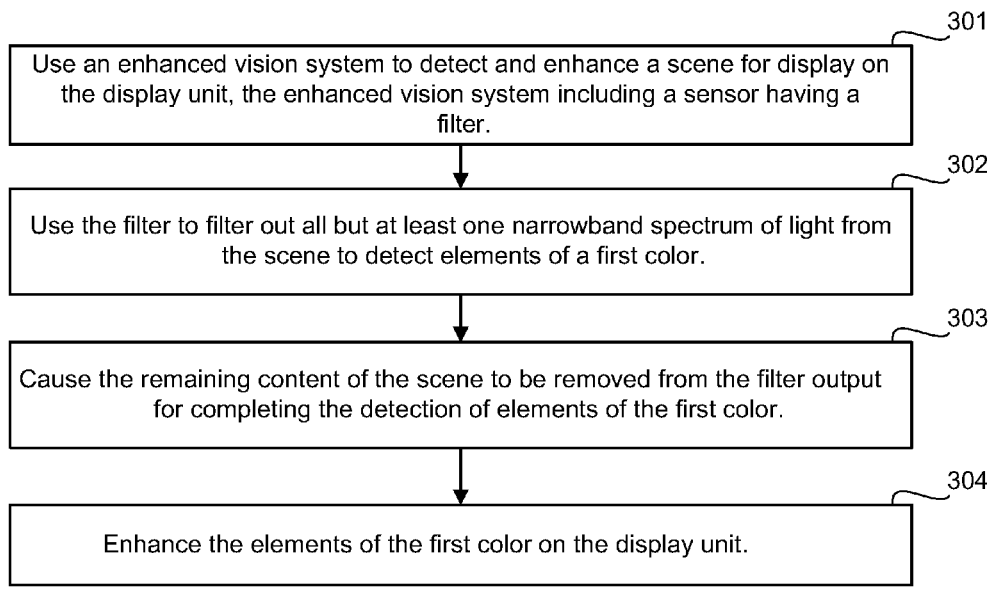
FIG. 3 is a flow chart of a process for controlling an image displayed on a display unit of an aircraft (e.g., using the system of FIG. 2), according to an exemplary embodiment.
Figure 11:
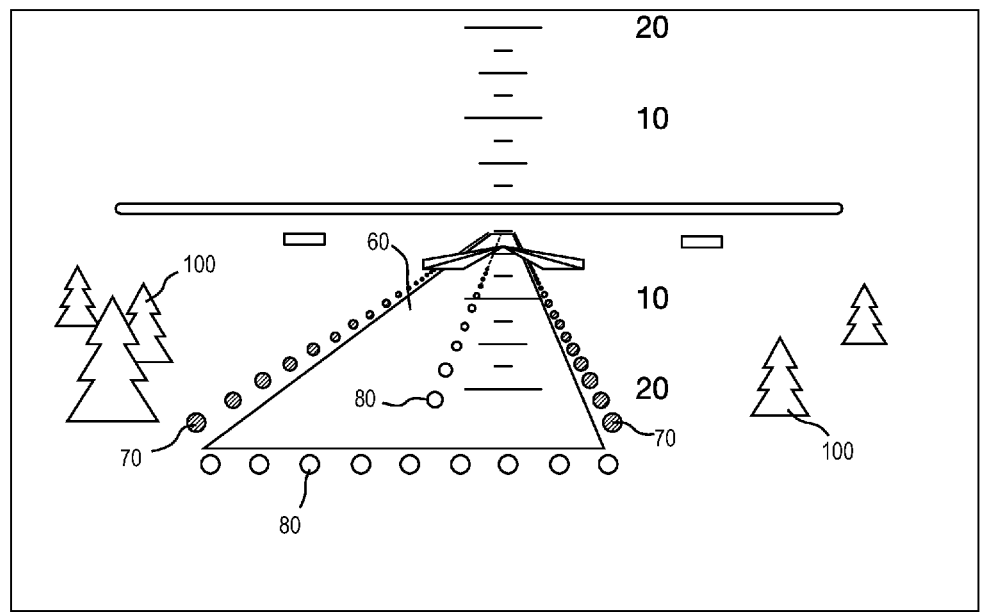
FIG. 11 is a simplified view of a generated display for an aircraft utilizing icons generated from the enhanced views of FIGS. 8-10, according to an exemplary embodiment.
Figure 12:
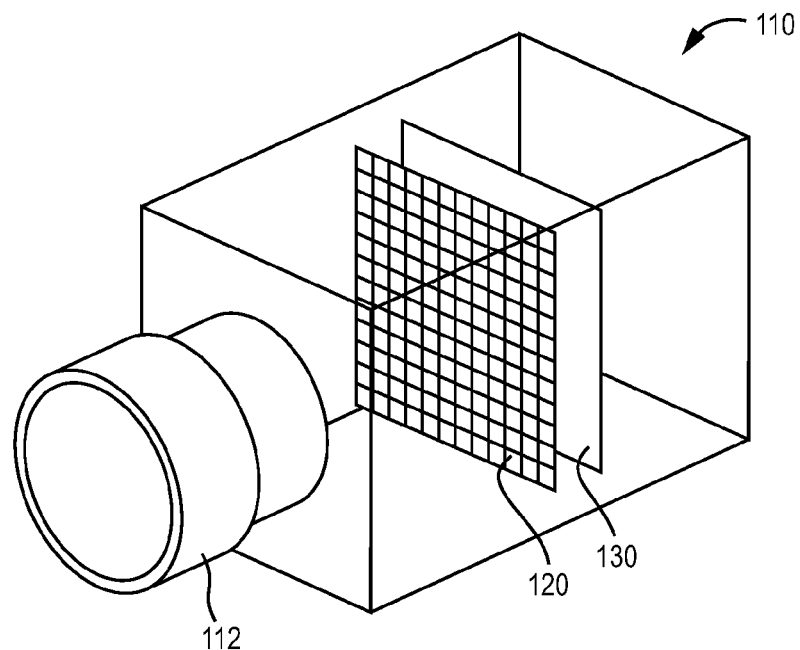
FIG. 12 is a perspective view of a camera for use with an enhanced vision system for an aircraft, according to an exemplary embodiment.

Referring now to FIG. 3, and also continuing to refer to FIG. 2, a flow chart of a process for enhancing an image displayed on a display unit of an aircraft is shown, according to an exemplary embodiment. The process is shown to include a step 301 of using an enhanced vision system (e.g., EVS 204 shown in FIG. 2) to detect and enhance a scene for display on the display unit (e.g., one of display units 20, head-up display 295, etc.). The enhanced vision system includes a sensor having a filter (e.g., sensor 110 and filter 120 as shown in FIG. 12). The process of FIG. 3 also includes a step 302 of using the filter to filter out all but at least one narrowband spectrum of light from the scene to detect elements of a first color. The process of FIG. 3 further includes causing the remaining content of the scene to be removed (e.g., partially, completely, etc.) from the filter output for completing the detection of elements of the first color (step 303). Finally, the process of FIG. 3 is shown to include enhancing the element of the first color on the display unit (step 304). Enhancing elements of a particular color can include boosting the filter output of the first color (e.g., to make it brighter, to increase the contrast relative to the surrounding pixels, etc.). Steps 302-304 are described in greater detail in FIGS. 4-24.

Figure 4:
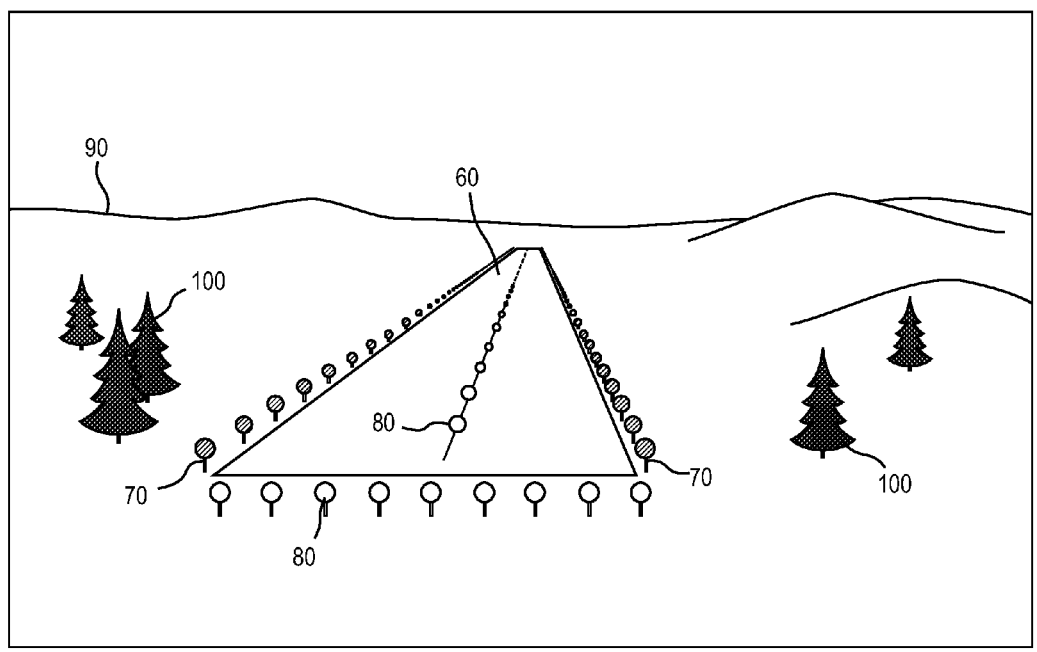
FIG. 4 is a view of a simplified natural scene viewed from a cockpit of an airplane, according to an exemplary embodiment.

Referring now to FIG. 4, a scene as viewed by a pilot from a cockpit of an aircraft is shown, according to an exemplary embodiment. As shown in FIG. 4, the scene includes an air strip or runway 60 having perimeter lights 70 (e.g., blue perimeter lights) provided on either edge of the airstrip 60 and directional lights 80 (e.g., red directional lights) provided along a front edge of the airstrip 60 and along a center axis of the airstrip 60. This scene also includes a horizon generally referenced as element 90 in FIG. 4 and at least one tree 100. It should be noted that the scene as shown in FIG. 4 shows only one simplified scene for the purposes of illustration, and that the systems and methods described herein can be applicable to many different types of scenes (e.g., scenes in a marine navigation environment, with e.g., colored buoys and other lighted navigation systems, more commercial environment, etc.).

Figure 13:
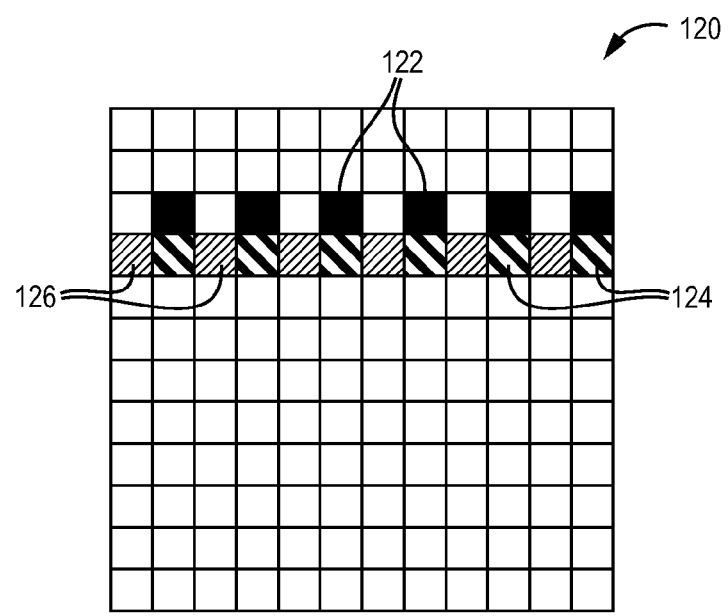
FIG. 13 is a schematic view of a filter for use with the camera shown in FIG. 12, according to an exemplary embodiment.

Because adverse viewing conditions (e.g., inclement weather, clouds, fog, smoke, etc.) may limit or impair a pilot's ability to effectively see the ALS and surrounding features of the scene, an enhanced vision system (e.g., the EVS 204) may be utilized to enhance the ALS features of an airport to aid in landing of the aircraft. According to one exemplary embodiment, EVS 204 may include a camera or other sensor (e.g., sensor 110 shown in FIG. 12) having a filter (e.g., narrow spectrum filter 120 as shown in FIGS. 12-13) that is configured to filter out all but at least one narrow band spectrum of light to detect and/or enhance elements of a specific color.

Figure 5:
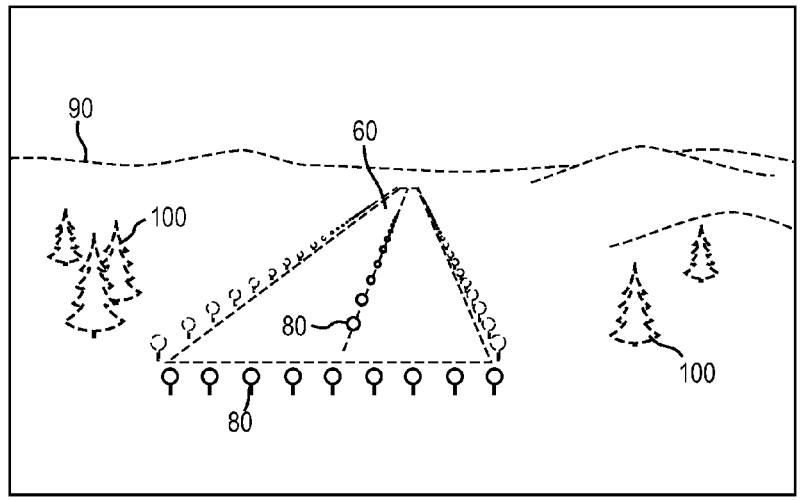
FIG. 5 is a filtered view of the scene of FIG. 4 showing detection of the red lights shown in FIG. 4, according to an exemplary embodiment.
Figure 6:
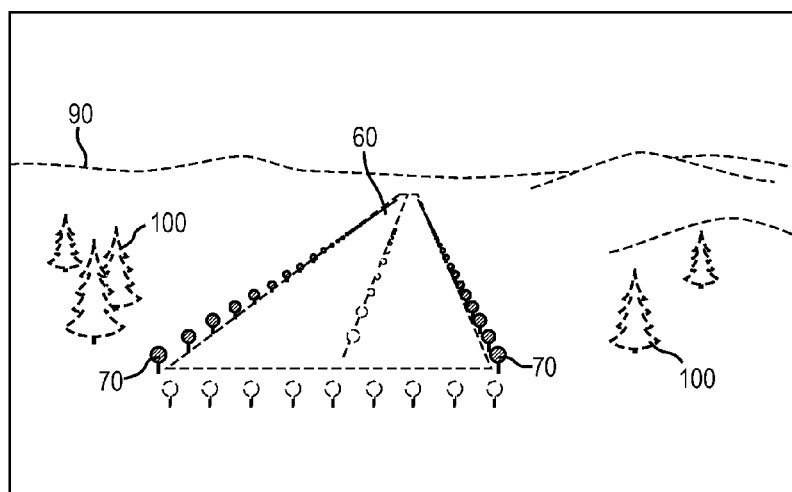
FIG. 6 is a filtered view of the scene of FIG. 4 showing detection of the blue lights shown in FIG. 4, according to an exemplary embodiment.
Figure 7:
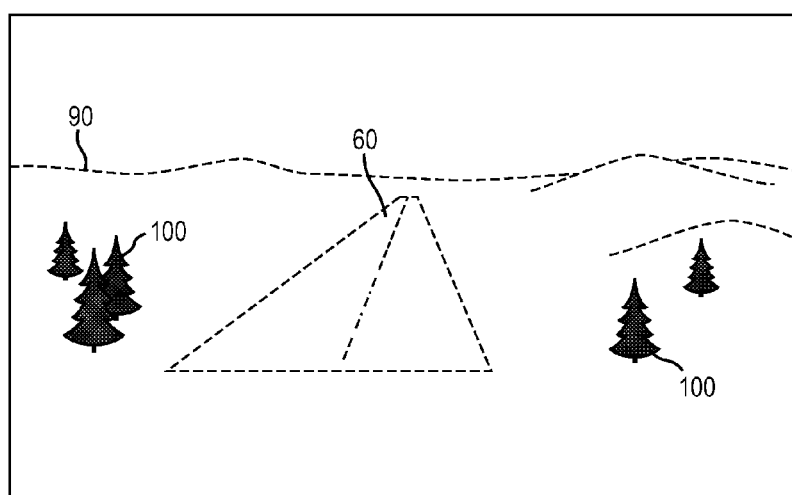
FIG. 7 is a filtered view of the scene of FIG. 4 showing detection of the green trees shown in FIG. 4, according to an exemplary embodiment.
Figure 11A:
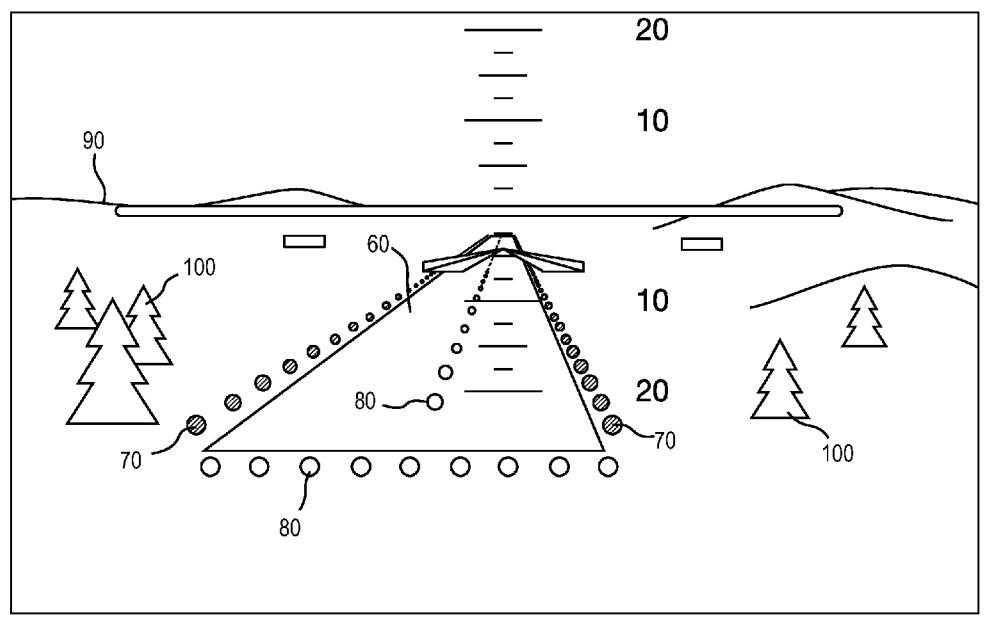
FIG. 11A is a simplified view of a generated display for an aircraft utilizing icons generated from the enhanced views of FIGS. 8-10 overlaid with the natural scene of FIG. 4, according to an exemplary embodiment.

Using a narrowband (e.g., narrow bandpass) filter, the camera may be configured or tuned to detect a particular set of wavelengths of light (e.g., red light from red LEDs, blue light from blue LEDs, green light from green trees, etc.) to create various electronic images showing the elements of a scene having a particular color (e.g., as shown in FIGS. 5-7). EVS 204 (and/or display electronics 212) may then use the images/video of the elements of the particular colors (e.g., the filter output) and background output of the camera (e.g., natural scene as shown in FIG. 4) to create or generate one or more uncluttered or enhanced electronic views wherein the elements having a specific wavelength (e.g., narrowband range of wavelengths) are enhanced. EVS 204 (and/or display electronics 212) may then use the uncluttered views of the enhanced elements to create or generate an image to display on a display unit. According to one exemplary embodiment, the image may contain icons that are representative of the enhanced elements (e.g., as shown in FIG. 11 or 11A).

FIGS. 5-10 illustrate exemplary intermediate electronic views from an enhanced vision system that are used by the enhanced vision system and/or display electronics to display a scene having enhanced elements. It should be appreciated that FIGS. 5-10 are for the purpose of illustration. Therefore, while FIGS. 5-10 may exist in memory of the EVS or of the display electronics, a completed scene (e.g., as shown in FIG. 11A) may be the only scene actually displayed in the aircraft.

In the example of FIGS. 5-10, a sensor (e.g., a visible light sensor such as shown in FIG. 12) detects elements of a scene (e.g., approach lighting systems or hazards such as trees, buildings, hills, mountains, etc) and prepares the detected elements for display. Enhancing the detected elements may include intensifying the detected elements relative to background information and providing the intensified elements to a scene on a display unit. Enhancing the detected light elements may include intensifying the light and drawing a circle around the intensified light or decluttering the portions of the scene that are not within certain wavelength bands. Depending on the wavelength filtering applied to the sensor or camera, many aspects of the scene other than the detected elements may be deemphasized. In some instances, a simplified representation of one or more of the enhanced elements may be shown as an icon (e.g., as shown in FIG. 11 or 11A). While certain icons are shown in FIGS. 11-11A, it should be appreciated that other icons or enhancements (e.g., filters, tags, gain increases, symbols, etc.) may be used to enhance elements detected by an enhanced vision system.

Referring to FIG. 5, a filtered view of the scene of FIG. 4 is illustrated. As shown in FIG. 5, the scene of FIG. 4 has been filtered (e.g., by a narrowband spectral filter 120 as shown in FIGS. 12-13) to detect a specific wavelength band of light present in the scene shown in FIG. 4. For example, as shown in FIG. 5, wavelengths of light equivalent to red light have been detected so that the red lights 80 along the front and center portions of the airstrip 60 are primarily the output of the narrowband filter. As illustrated in FIG. 5, some remaining content or physical aspects of the scene may remain in the filter output. In the illustration, for example, the remaining or residual background components of the scene shown in FIG. 4 are shown with less intensity (broken lines) because they have been mostly filtered out relative to the red lights 80.

Similarly, as shown in FIG. 6, a filtered view of the scene of FIG. 4 is illustrated. As shown in FIG. 6, the scene of FIG. 4 has been filtered (e.g., by a narrowband spectral filter 120 as shown in FIGS. 12-13) to detect a specific wavelength of light present in the scene shown in FIG. 4. For example, as shown in FIG. 6, wavelengths of light equivalent to blue light have been detected so that the blue lights 70 along either side of the airstrip 60 are provided as a filter output, while remaining content or physical aspects of the scene shown in FIG. 4 are faintly remaining (e.g., the remaining or residual background components of the scene shown in FIG. 4 are not completely removed by the narrowband filter centered around blue light).

Likewise, as shown in FIG. 7, a filtered view of the scene shown in FIG. 4 is shown according to an exemplary embodiment. As shown in FIG. 7, the scene of FIG. 4 has been filtered (e.g., by a narrowband spectral filter 120 as shown in FIGS. 12-13) to detect a specific wavelength of light present in the scene shown in FIG. 4. For example, as shown in FIG. 7, wavelengths of light equivalent to green light have been detected so that the green trees 100 along either side of the airstrip 60 are provided as filter output, while remaining content or physical aspects of the scene shown in FIG. 4 are faintly remaining (e.g., the remaining or residual background components of the scene shown in FIG. 4 are not completely removed by the narrowband filter centered around wavelengths associated with green trees).

Figure 8:
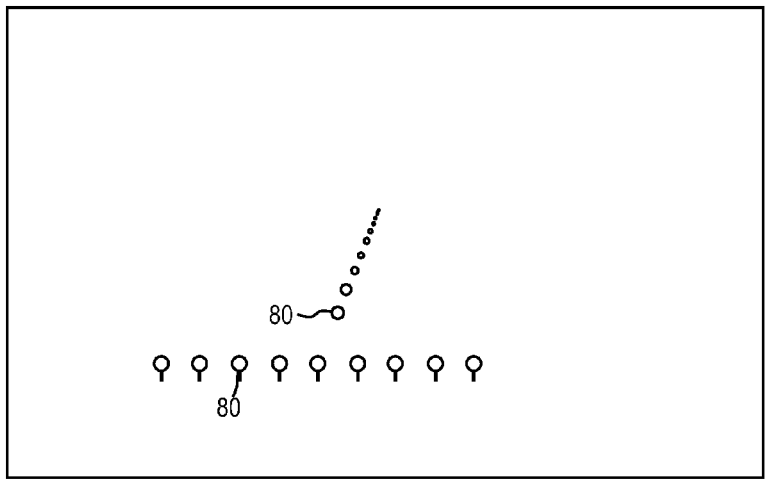
FIG. 8 is a decluttered or enhanced view of FIG. 5 showing only the red lights of FIG. 5, according to an exemplary embodiment.
Figure 9:
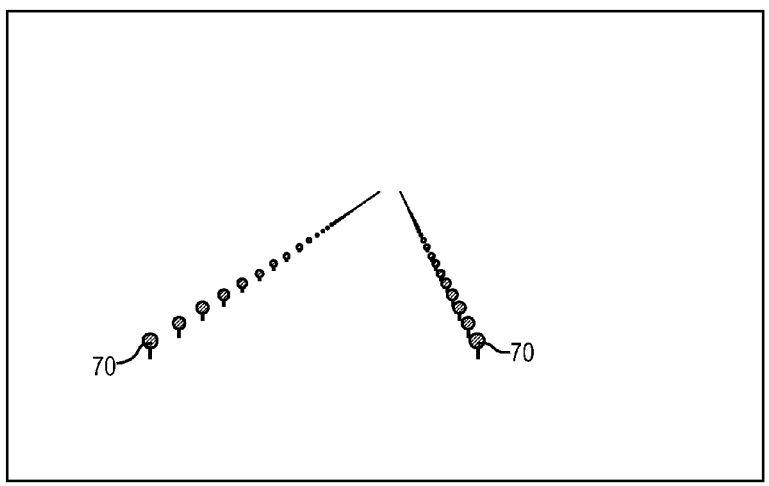
FIG. 9 is a decluttered or enhanced view of FIG. 6 showing only the blue lights of FIG. 6, according to an exemplary embodiment.
Figure 10:
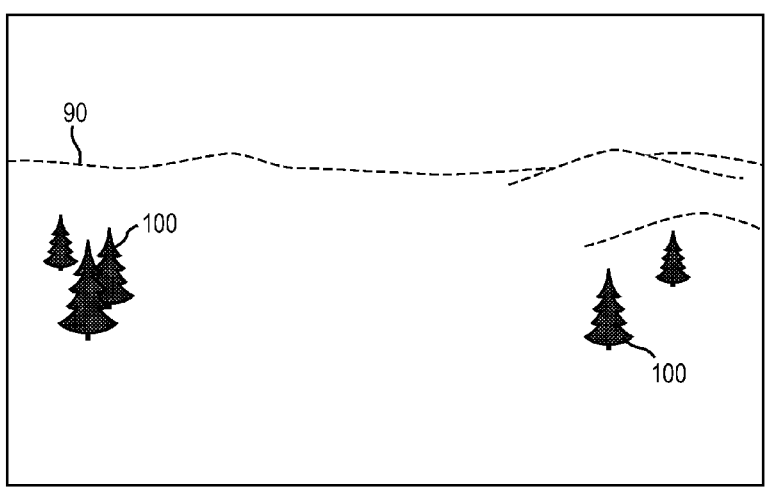
FIG. 10 is a decluttered or enhanced view of FIG. 7 showing only the green trees of FIG. 7, according to an exemplary embodiment.

According to an exemplary embodiment, EVS 204 and/or display electronics 212 may perform further processing on the filter outputs of FIGS. 5-7 in order to further extract the target objects. The results of such further processing are illustrated in FIGS. 8-10. In an exemplary embodiment, EVS 204 and/or display electronics 212 use the unfiltered view of the scene shown in FIG. 4 to further remove the residual background information from the filtered outputs.

For example, the unfiltered view of the scene shown in FIG. 4 may be partially subtracted from the filter output of FIG. 5 (showing the filter output of a filter for the red lights 80) to remove the filter output's residual background information. Such processing may result in the uncluttered or enhanced view of FIG. 8, showing only the red lights 80 and their location within the camera view. As illustrated, the enhanced view shown in FIG. 8 shows only the red lights 80 and the rest of the elements (airstrip 60, trees 100, etc.) are not shown.

Similarly, the unfiltered view of the scene shown in FIG. 4 may be partially subtracted from the filter output of FIG. 6 (showing the filter output of a filter for the blue lights 70) to remove the filter output's residual background information. Such processing may result in the uncluttered or enhanced view of FIG. 9 showing only the blue lights 70 and their location within the scene. As illustrated, the enhanced view shown in FIG. 9 shows only the blue lights 70 and the rest of the elements (airstrip 60, trees 100, etc.) are no longer present. It should be appreciated that the subtraction discussed in this application may not entirely remove all background information from given filter's output.

Relative to FIG. 10, the unfiltered view of the scene shown in FIG. 4 may be partially subtracted from the filter output of FIG. 7 (showing the filter output for a filter of the green of the trees 100) to remove the filter output's residual background information. Such processing may result in the uncluttered or enhanced view of FIG. 10 showing only the green of the trees and their location within the view. As illustrated, the enhanced view shown in FIG. 10 shows only the green trees 100 and the rest of the elements (airstrip 60, red lights 80, blue lights 70) are no longer present.

One advantageous feature of EVS 204 is that the enhanced views (e.g., as shown in FIGS. 8-10) may help increase the contrast of the specific colored elements (e.g., elements of a first color, elements of a second color, elements of a third color, and so on) in comparison to what is finally output in the aircraft. Enhanced elements of a first color may then be combined with enhanced elements of a second (and a third) color to create or generate a combined image as shown in FIG. 11. Individual features or elements (e.g., red lights 80, blue lights 70, trees 100, etc.) may be shown in greater contrast relative to the background than would otherwise be available without the EVS 204. It is important to note that once the extractions resulting in FIGS. 8-10 have occurred, different enhancements may be applied to each set of objects. For example, once the red lights are detected, they may be enlarged, circled, brightened, or otherwise enhanced prior to combination with the blue lights and the trees. According to an exemplary embodiment, as shown in FIG. 11, simplified schematic symbols or icons may replace actual detected elements. The simplified symbols or icons help to enhance or declutter the image a pilot would otherwise normally see, allowing the pilot to focus on the important elements of the image or scene. Icons may include simplified block shapes (e.g., circles, squares, rectangles, etc.) or figures (e.g., simplified figures of trees, buildings, etc.). In FIG. 11, the trees are simplified as outlined icons so as to reduce their distraction to the pilot. According to various exemplary embodiments, the icons and/or lights or features shown in the electronically generated scene of FIG. 11 may be otherwise individually, separately, or specifically enhanced and/or improved. For example, the specific colors may be made more prominent depending on the environment (night, day) or the display device (HUD, HDD, etc.). Further, lights can be made into icons or symbols for improving the utility and detectability of the lights.

According to one exemplary embodiment, symbols or icons may be superimposed on the natural scene for improved clarity (e.g., such as shown in FIG. 11A). For example, the symbols or icons may be superimposed on a HUD or on another display, with certain features shown enhanced and other less important features shown less prominently. According to an exemplary embodiment, the icons are at least partially transparent. According to one exemplary embodiment, the EVS 204 and/or the display electronics 212 may be configured to cause the enhanced elements from the enhanced vision system 204 to overlay at least some of the contents of the scene. For example, a first sensor (e.g., a visual light sensor) is used to enhance elements of a scene as described above and a second sensor (e.g., an infrared sensor, near infrared sensor) is used to detect background content of the scene, with the enhanced images from the first sensor superimposed or overlaid with the background image capture of the scene from the second sensor.

The enhanced view as shown in FIG. 11 or 11A aids a pilot of the aircraft in landing the aircraft in poor visibility situations. Because EVS 204 uses a camera or other sensor (e.g., sensor 110 as shown in FIG. 12) that is able to see (read, view, pick up, etc.) certain elements that the unassisted eye of a pilot would not otherwise be able to see, the EVS 204 provides an enhanced viewing system for the pilot.

Referring now to FIG. 12, a sensor shown as camera 110 for use with an EVS 204 is shown according to an exemplary embodiment. Camera 110 may include unfiltered optics 112, a filter or filter mask 120 and a broadband detector 130. According to one exemplary embodiment, the broadband detector 130 is a focal plane array (FPA) that has broadband sensitivity over a large band of wavelengths. According to one exemplary embodiment, the detector may include a silicon UV-NIR element, a MCdT 3-18 micrometer IR element, or other suitable element.

Referring now to FIG. 13, the filter 120 is shown schematically according to an exemplary embodiment. Filter 120 includes subsets of cells or holes that are configured to filter a specific wavelength or color of light. For example, the filter 120 includes a plurality of cells 122 (e.g., configured to filter a red light), a plurality of cells 124 (e.g., configured to filter a blue light), and a plurality of cells 126 (e.g., configured to filter a green light). According to one exemplary embodiment, a combination of the cells 122, 124, 126 may be used together to detect white light (e.g., if light is detected by the red, blue, and green filtered outputs, the light is white). According to other exemplary embodiments, different subsets of cells may be combined to filter or detect different wavelengths of light. For example, according to an exemplary embodiment, the red and green cells may be used together to detect a yellow light (e.g., if light is detected by the red and green filtered outputs, the light is yellow).

According to one exemplary embodiment, the filter is a multi-cell filter having apertures of varying sizes for conducting narrowband filtering of light from the scene. According to this exemplary embodiment, the apertures of the multi-cell filter includes at least a first set of apertures for filtering light from the scene to detect elements of a first color. The multi-cell filter may also include a second set of apertures (different from the first set) for filtering light from the scene to detect elements of a second color. The multi-cell filter may also include a third (or fourth, fifth, etc.) set of apertures (different from the other sets) for filtering light from the scene to detect elements of a third (or fourth, fifth, etc.) color.

Figure 14A:
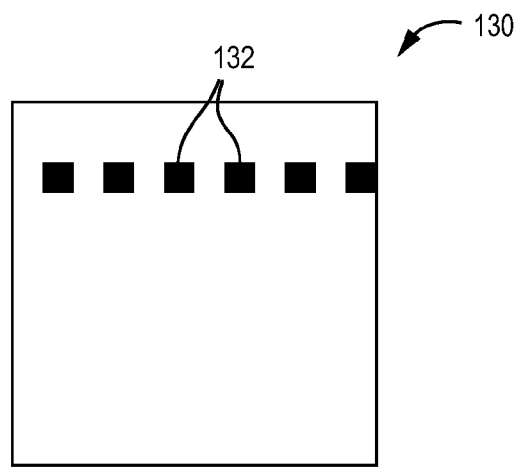
FIGS. 14A-14C are schematic views of a detector for use with the camera shown in FIG. 12, according to an exemplary embodiment.
Figure 14B:
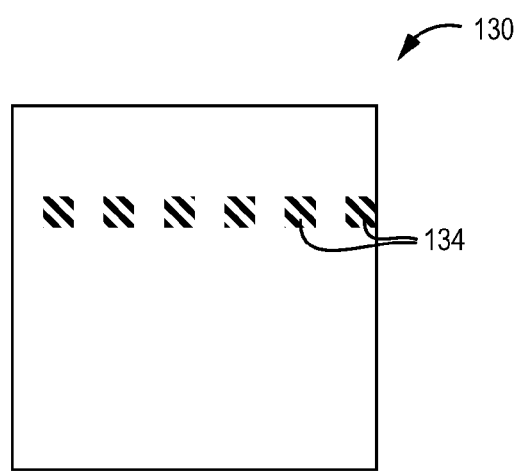
Figure 14C:
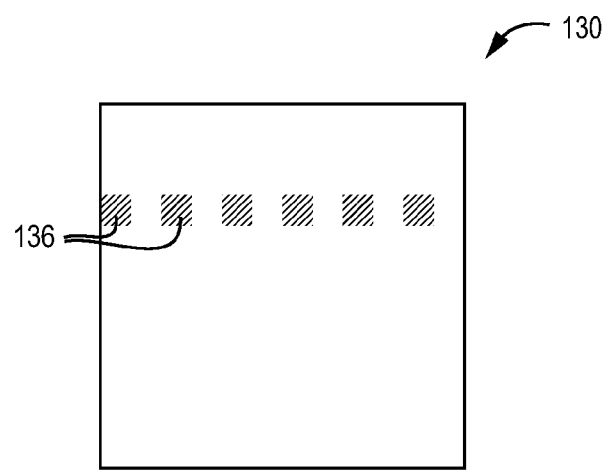

According to an exemplary embodiment, the detector 130 is a focal plane array configured to use some cells of its array to detect output from the first filter, other cells of its array to detect output from the second filter, and yet other cells of its array to detect output from the third filter. According to an exemplary embodiment, wavelengths can be skimmed to allow only the brightest light or pixels through the filter 120. For example, filter 120 may be configured to allow only 10% of the brightest lights or pixels through the filter 120 to be detected by detector 130. Referring now to FIGS. 14A-14C, various embodiments of wavelength detection for detector 130 are shown, according to exemplary embodiments. For example, FIG. 14A shows pixels 132 having detected light corresponding to cells 122 of filter 120. Similarly, FIG. 14B shows pixels 134 having detected light corresponding to cells 124 of filter 120. Likewise, FIG. 14C shows pixels 136 having detected light corresponding to cells 126 of filter 120. As one of skill in the art would readily recognize, many different cell/pixel combinations are possible with filter 120 having detector 130. As shown in FIGS. 14A-14C, each subset of pixels (e.g., pixels 132, 134, 136) are configured or tuned to detect a specific color wavelength of light (or range of wavelengths of light) while filtering out light of other colors.

According to an exemplary embodiment, multiple cameras or sensors (e.g., sensor 110) may be used with an EVS (e.g., EVS 204). In this exemplary embodiment, each sensor has its own filter configured to filter out all but one narrowband spectrum of light from the scene. For example, each sensor may be configured to filter and detect a specific color or wavelength of light (e.g., a first sensor for red light, a second sensor for blue light, a third sensor for green light, etc.).

Figure 15:
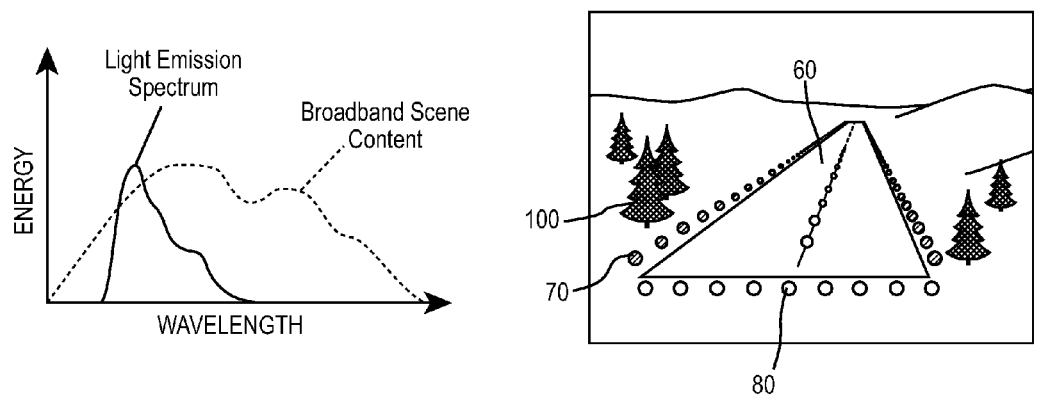
FIG. 15 is a general graphical depiction of a light emission spectrum and a broadband scene content based on wavelength versus energy, according to an exemplary embodiment.

Referring now to FIG. 15, a general graphical depiction of light emission spectrum and broadband scene content is shown based on wavelength versus energy. The light emission spectrum and broadband scene content generally include all the elements of a scene (e.g., the scene shown in FIG. 4).

Figure 16:
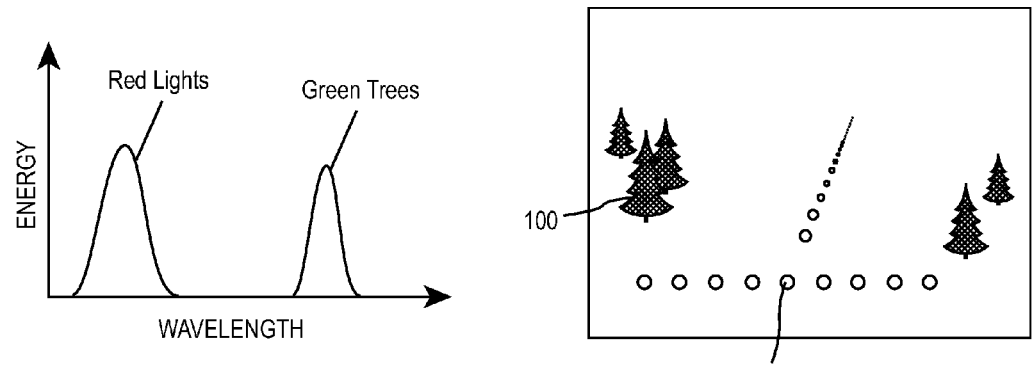
FIG. 16 is a graphical depiction of certain spectral bands of interest based on wavelength versus energy, according to an exemplary embodiment.
Figures 17, 18, 19:
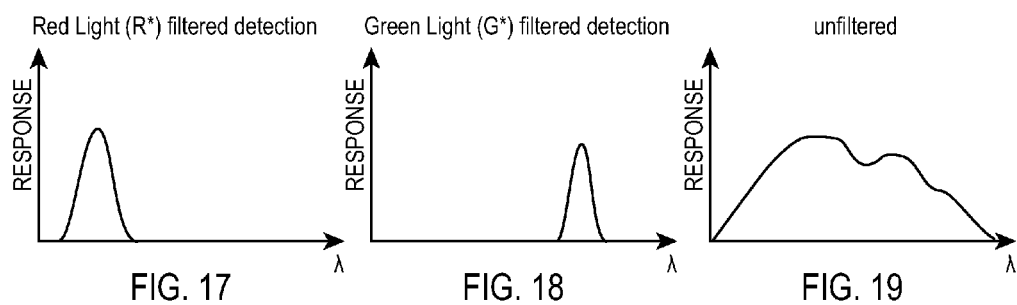
FIGS. 17-18 are graphical depictions of the filtered detection outputs for certain spectral bands of interest, according to an exemplary embodiment.
FIG. 19 is a graphical depiction of an unfiltered broadband scene content, according to an exemplary embodiment.

However, as shown in FIG. 16, an EVS (e.g., EVS 204) may only be interested in certain spectral bands of color or light (e.g., red light spectral band, green light spectral band, etc.). As shown in FIGS. 17 and 18, the unfiltered broadband scene content (e.g., as shown in FIG. 19) can be filtered (e.g., by filter 120) and detected (e.g., by detector 130) to produce the filtered response for a specific wavelength of light (or range of wavelengths of light). For example, FIG. 17 shows the filtered detection response for red light (represented as R*); and FIG. 18 shows the filtered detection response for green light (represented as G*).

Figures 20, 21, 22:
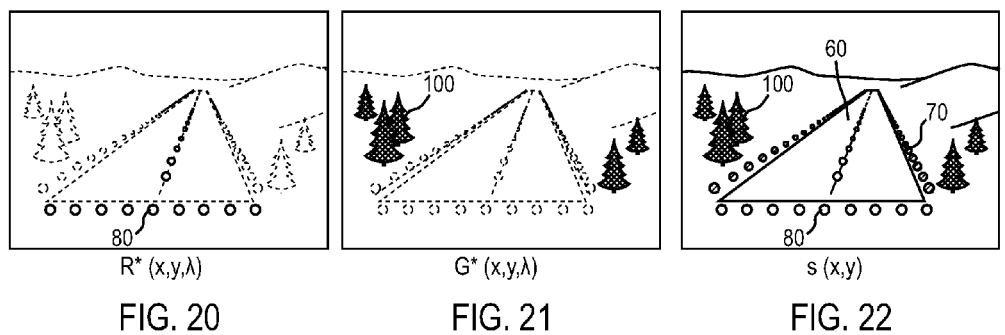
FIGS. 20-21 are graphical representations of the filtered detection outputs corresponding to FIGS. 17-18, respectively, according to an exemplary embodiment.
FIG. 22 is a graphical representation of the unfiltered broadband scene content corresponding to FIG. 19, according to an exemplary embodiment.

The filtered detection responses R* and G* (e.g., as shown in FIGS. 17-18) correspond to the filtered depictions shown in FIGS. 20 and 21, respectively. For example, by filtering and detecting red light from the unfiltered scene (e.g., as shown in FIG. 22), the red lights 80 can be enhanced from the rest of the scene content. This is graphically depicted in FIG. 20, which shows the enhancement of the red lights 80, with the remaining background content showing up only faintly. The graphical depiction of the filtered detection response R* may be expressed as $R^*(x,y,\lambda)$, where x and y are the spatial coordinates of the scene or detector (e.g., a FPA) and $\lambda$ denotes a wavelength, or spectral, dependency. Similarly, by filtering and detecting green light from the unfiltered scene (e.g., as shown in FIG. 22), the green trees 100 can be enhanced from the rest of the scene content. This is graphically depicted in FIG. 21, which shows the enhancement of the green trees 100, with the remaining background content showing up only faintly. The graphical depiction of the filtered detection response G* may be expressed as $G^*(x,y,\lambda)$.

Figures 23, 24:
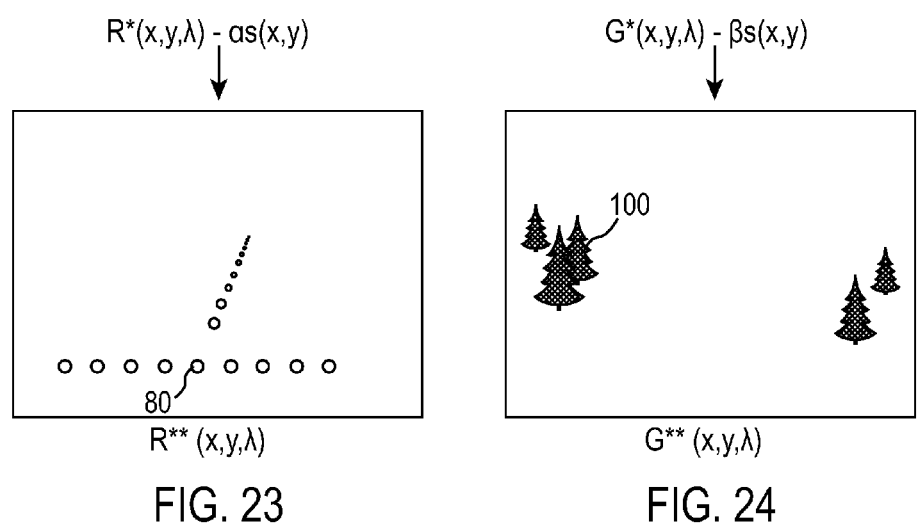
FIGS. 23-24 are graphical representations of the enhanced filtered detection outputs corresponding to FIGS. 20-21, respectively, after having been compared to the unfiltered broadband scene content of FIG. 22, according to an exemplary embodiment.

According to an exemplary embodiment, the EVS may then compare the filtered detection responses (or the graphical representation of the filtered detection responses) to the unfiltered response (or the graphical representation) of the unfiltered scene to create an uncluttered enhancement of the specific or target wavelength of light (or range of wavelengths of light). For example, as shown in FIG. 23, the uncluttered enhancement of the red lights 80 is shown. Similarly, as shown in FIG. 24, the uncluttered enhancement of the green trees 100 is shown.

According to an exemplary embodiment, the comparison of the filtered detection responses (or the graphical representation of the filtered detection responses) to the unfiltered response (or the graphical representation) of the unfiltered scene can be expressed by Equations 1 and 2 provided below.

$$R^*(x,y,\lambda) - \alpha s(x,y) = R^{**}(x,y,\lambda) \quad (1)$$

$$G^*(x,y,\lambda) - \beta s(x,y) = G^{**}(x,y,\lambda) \quad (2)$$

As used in Equations 1 and 2, a and 13 are scaled luminance factors and s(x,y) is equal to the unfiltered broadband scene. According to one exemplary embodiment, α and/or β can be chosen to maximize the contrast of the resulting filtered scene detail. For example, if R*(x,y,λ) has 10% of the background scene content, α can be set to 0.1 to subtract 10% of the scene from R*(x,y,λ) to produce un uncluttered filtered response.

The construction and arrangement of the systems and methods as shown in the various exemplary embodiments are illustrative only. Additional embodiments are possible. For example, the enhanced vision systems described herein may be used to detect traffic control signals (e.g., having red, yellow, and green lights), or for detecting marine navigation lights (e.g., having red or green lights). According to another exemplary embodiment, the enhanced vision systems described herein may be used to detect lights of a Precision Approach Path Indicator (PAPI). A PAPI is a visual aid that provides guidance information to help a pilot acquire and maintain the correct approach (in the vertical plane) to an aerodrome or an airport. It is generally located beside the runway (e.g., approximately 300 meters beyond the landing threshold of the runway).

A PAPI is a light array positioned beside the runway, and normally consists of four equi-spaced light units color coded to provide a visual indication of an aircraft's position relative to the designated glide slope (e.g., approach angle) for the runway. An abbreviated system consisting of two light units can be used for some categories of aircraft operations. The PAPI is usually located on the left hand side of the runway at right angles to the runway centre line, but it can also be lactated on the right side of the runway. The individual light units are generally spaced 9 meters apart with the nearest unit generally 15 meters from the runway edge.

Each light unit of the PAPI consists of one or more light sources, red filters and lenses. Each light unit emits a high intensity beam, with a lower segment of the beam being red and an upper part white. The transition between the two colors must take place over a predefined angle (e.g., not greater than three minutes of arc). This characteristic makes the color change very conspicuous, a key feature of the PAPI signal.

To form the PAPI guidance signal the color transition boundaries of the four units are fixed at different angles. The lowest angle is used for the unit furthest from the runway, the highest for the unit nearest to the runway. The designated glide slope is midway between the second and third light unit settings. Depending on the position of the aircraft relative to the specified angle of approach, the lights will appear either red or white to the pilot. The pilot will have reached the normal glide path (usually 3 degrees) when there is an even number of red and white lights. If an aircraft is beneath the glide path, red lights will outnumber white; if an aircraft is above the glide path, more white lights are visible. By detecting the lights (e.g., either the red lights or the white lights) of the PAPI system with an EVS, the pilot can maneuver the aircraft to obtain an even number of red and white lights to obtain the proper glide slope.

Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variations will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An enhanced vision system for providing an enhanced image displayed on a display unit of an aircraft, the enhanced vision system comprising:
a sensor and a processor in communication with the sensor, wherein the processor receives data representing a visible light view of the scene and data representing a first and second filtered view of the scene, wherein the filtered view is provided using at least two narrowband spectral filters configured to detect a particular set of wavelengths of low thermal light that represents lighting objects with a specific color in a colored navigation system, wherein a first filter is focused on a first narrowband frequency and wherein a second filter is focused on a second narrowband frequency which does not substantially overlap with the first narrowband frequency, wherein, for each filter, the data representing the visible light view of the scene is subtracted from the data representing the respective filtered view of the scene, wherein the subtraction comprises first (a) multiplying the visible light view of the scene by a first scaled luminance factor associated with the first filter, and (b) multiplying the visible light view of the scene by a second scaled luminance factor associated with the second filter, and wherein the subtraction further comprises setting the first and second scaled luminance factors to different values such that the subtraction takes into account a first amount of background scene content associated with the first filter relative to a second amount of background scene content associated with the second filter;

wherein the results of the subtraction involving the first filter and the subtraction involving the second filter are combined to create an image with a high contrast relative to the background scene and that highlights two different colors.

2. The system of claim 1, wherein the filter is a multi-cell filter having apertures of varying sizes for conducting narrow band filtering of light from the scene, the filter being disposed in the sensor.

3. The system of claim 2, wherein the apertures of varying sizes comprise a first set of apertures for filtering light from the scene to detect elements of the first color.

4. The system of claim 3, wherein the apertures of varying sizes comprises a second set of apertures for filtering light from the scene to detect elements of a second color.

5. The system of claim 1, wherein the enhanced vision system comprises multiple sensors, each sensor comprising a respective filter configured to filter out all but at least one respective narrowband spectrum of light from the scene.

6. The system of claim 1, wherein the filter is configured to filter out all but at least one narrowband spectrum of light from the scene for detection of elements of a first color.

7. The system of claim 6, wherein the first color is a color of one type of runway light.

8. The system of claim 6, wherein the enhanced vision system is configured to enhance elements in the data representing the filtered view by increasing a level of the first color and display icons representative of the elements of the first color simultaneously with the scene.

9. The system of claim 6, wherein the enhanced vision system is configured to display icons representative of the elements of the first color along with one of a graphically drawn runway centerline or a graphically drawn runway outline.

10. The system of claim 6, wherein display electronics are configured to overlay icons representative of the enhanced elements of the first color with a background image capture of the scene.

11. The system of claim 10, wherein the icons representative of the elements of the first color are at least partially transparent.

12. The system of claim 1, wherein the scene comprises elements of an approach lighting system or at least one hazard.

13. The system of claim 12, wherein the at least one hazard comprises a tree.

14. The system of claim 1, wherein the enhanced vision system comprises an additional sensor, wherein the additional sensor is an infrared sensor used to detect background content of the scene.

15. A method for enhancing an image displayed on a display unit of an aircraft, comprising:

using an enhanced vision system to detect a scene for display on the display unit, the enhanced vision system comprising a visible light sensor comprising a narrowband spectral filter;

using the narrowband filter to filter out all but at least one narrowband spectrum of low thermal visible light that represents lighting objects with a specific color in a colored navigation system from the scene to detect elements of a first color to provide a first filtered scene;

multiplying data associated with the scene by a scaled luminance factor configured to approximately match the amount of background content present in the first filtered scene;

subtracting a content of the scene from the first filtered scene for completing the detection of the elements of the first color; and repeating the using, multiplying, and subtracting steps for a second color, a second filtered scene, and using a second scaled luminance factor such that a second copy of the scene is multiplied by the scaled luminance factor configured to approximately match the amount of background content present in the second filtered scene;

combining the results of both subtractions to enhance elements of both the first color and the second color on the display unit while reducing the background content of the scene.

* * * * *